United States Patent [19]
DiFrancesco

[11] Patent Number: 5,831,757
[45] Date of Patent: Nov. 3, 1998

[54] MULTIPLE CYLINDER DEFLECTION SYSTEM

[75] Inventor: David DiFrancesco, San Francisco, Calif.

[73] Assignee: Pixar, Richmond, Calif.

[21] Appl. No.: 713,963

[22] Filed: Sep. 12, 1996

[51] Int. Cl.$^6$ ................................................. G02B 26/08
[52] U.S. Cl. .................... 359/198; 359/199; 359/201; 359/202; 359/214; 359/223; 348/98
[58] Field of Search .................... 359/196–202, 359/212–214, 223, 225–226, 900; 355/84; 399/151, 216; 358/474, 497; 347/225, 260; 348/98

[56] References Cited

U.S. PATENT DOCUMENTS

| | | |
|---|---|---|
| 2,821,172 | 1/1958 | Randall . |
| 2,922,399 | 1/1960 | Panissidi et al. . |
| 4,409,624 | 10/1983 | Kingsley ................................. 358/496 |
| 4,505,578 | 3/1985 | Balasubramanian . |
| 4,608,578 | 8/1986 | Balasubramanian et al. . |
| 4,698,649 | 10/1987 | Lee . |
| 4,739,416 | 4/1988 | Manian . |
| 4,838,632 | 6/1989 | Manian . |
| 5,093,685 | 3/1992 | Blanding . |
| 5,161,449 | 11/1992 | Everett, Jr. . |

OTHER PUBLICATIONS

DiFrancesco, David, "Laser Based Color Film Recorder System with GaAs Microlaser," *Proceedings of the SPIE—The International Society of Optical Engineering*, Jan. 17–20, 1989, pp. 16–26.

*Primary Examiner*—James Phan
*Attorney, Agent, or Firm*—Hecker & Harriman

[57] ABSTRACT

The present invention provides precise constant velocity linear motion for reading and writing information over an area. The present invention uses a multiple cylinder linear feed unit to move a reflective surface and control the deflection of one or more beams. One embodiment of the present invention involves use of a pneumatic/hydraulic linear feed unit with a three color laser based film scanner/recorder system. The system can convert a film image to a digitized image capable of being processed by a computer and can also convert a digitized image to a film image. Two-axis scanning of a film frame is accomplished using a single scan mirror attached to a galvanometer scanner. The scan mirror and galvanometer scanner are coupled to a custom controlled rotary head assembly. The galvanometer deflects the scan mirror in a fast scan direction to create a scanline of the laser beam. A pneumatic/hydraulic linear feed unit is used to rotate the galvanometer assembly. By rotating the head assembly, the entire galvanometer assembly is moved, resulting in displacement of the beam along a slow scan axis across the film plane.

17 Claims, 4 Drawing Sheets

MULTIPLE CYLINDER DEFLECTION SYSTEM

BACKGROUND OF THE INVENTION

1. Field of the Invention

The present invention relates to the field of scanning and recording information, particularly a method and apparatus for providing precise constant velocity linear motion for scanning and recording information.

2. Background Art

Information, such as that which comprises an image, is often most meaningful when taken as a whole. However, such information can be transmitted, stored, and processed more easily when broken down into smaller elements. For example, an image may be characterized by the collection of individual picture elements, or pixels, of which it is comprised. However, a technique is needed to extract information about the pixels from the image as a whole. Likewise, after transmitting, storing, or processing the pixels, a technique is needed to return the information to the form of an image as a whole.

One technique used to read information from and store information to an area involves the use of one or more lasers that are deflected across the area. If the area comprises an image, for example an image on photographic film, information may be read from the image by placing one or more optical detectors in front of or behind the image to detect reflected or transmitted light. If the area comprises a photosensitive material, for example unexposed photographic film, information may be written to the photosensitive material by varying the intensity of one or more lasers as they are deflected across the photosensitive material.

However, one of the factors that limits resolution of such techniques is the limited precision with which a laser beam can be deflected across an area. To provide deflection across a two dimensional surface, precise relative motion must be provided between the laser beam and the surface in at least two dimensions.

In the prior art, various techniques are used to provide relative motion between a scanning or recording beam and a surface to be scanned or recorded. For example, one prior art technique is found in U.S. Pat. No. 4,505,578, issued to Balasubramanian on Mar. 19, 1985, which teaches a transport for a laser writing and reading system in which a carriage carrying a photosensitive medium is propelled by a falling mass. A hydraulic dashpot cylinder is provided to brake the fall of the mass, causing the carriage to move with a uniform velocity. A laser having a beam for scanning in a line transverse to the direction of motion of the carriage is also provided.

U.S. Pat. No. 4,608,578, issued to Balasubramanian et al. on Aug. 26, 1986, discloses a transport mechanism for laser scanners that is braked by a hydraulic cylinder. Movement of the transport results from a mass falling under the influence of gravity, a compressed gas, or a compressed spring. A servo system is provided to control and correct for errors in the rate of descent of the transport carriage. The servo system uses a linear position encoder for measuring carriage velocity. The carriage carries either photosensitive material or a laser.

Both U.S. Pat. No. 4,505,578 and U.S. Pat. No. 4,608,578 suffer from the disadvantage that they rely upon movement of the photosensitive medium. While these patents discuss computer storage of X-ray images, which typically are obtained using individual sheets of film, other types of film, such as motion picture film, typically have the form of rolls containing many sequential images. For film having the form of a roll, a film transport mechanism is usually used to move from one image to another on the roll of film. Attempts to use such a film transport mechanism in the systems of U.S. Pat. Nos. 4,505,578 and 4,608,578 would be frustrated by the need to mount the entire film transport mechanism with all of its moving parts on a moving carriage.

U.S. Pat. No. 4,838,632, issued to Manian on Jun. 13, 1989, teaches a beam scanning system having a beam reflecting element, such as a mirror, disposed in the path of an incident beam that is pivotable about two perpendicular axes so as to provide for scanning a reflected beam in two dimensions. A mirror is rotatable by a galvanometer about a first axis. The mirror and galvanometer are rotatable in unison by a stepper motor about a second axis. The mirror and galvanometer mounted on a bracket that is attached to a shaft. The shaft is, in turn, connected to a relatively large wheel that is belt driven by a stepper motor with a relatively small shaft.

U.S. Pat. No. 4,838,632 suffers from the disadvantage that stepper motors do not provide smooth motion. Rather, stepper motors move in steps having a predetermined angle. Thus, it is not possible to adjust the increments in which the motion is imparted. Moreover, the drive belt connected to the stepper motor may slip, causing positioning errors, or may exhibit elasticity, causing oscillation in positioning and requiring additional settling time before galvanometer motion may begin, causing unwanted banding in the resultant scanned image.

SUMMARY OF THE INVENTION

The present invention provides precise constant velocity linear motion for reading information from and writing information to an area. The present invention uses a multiple cylinder linear feed unit to move a mirror and control the deflection of one or more light beams.

The present invention avoids the disadvantages of prior art moving carriage techniques since it imparts relative motion by deflecting light beams, allowing the area from or to which information is to be read or written to remain stationary during exposure. Thus, any film transport used to move film from or to which information is to be read or written may remain stationary. Complications associated with film transport mechanisms mounted to prior art moving carriages are avoided.

The present invention provides one or more pneumatic or hydraulic cylinders to impart motion to components that deflect one or more light beams. The present invention also provides one or more pneumatic or hydraulic cylinders to dampen and smooth the motion.

One embodiment of the present invention involves use of a pneumatic/hydraulic linear feed unit with a three color laser based digital film scanner/printer system. The digital film scanner/printer is capable of reading and writing 35 mm film formats. The system can convert a film image to a digitized image capable of being processed by a computer and can also convert a digitized image to a film image. The system allows traditionally photographed motion picture film to be intercut or blended with digital raster image photography.

Two-axis scanning of a film frame is accomplished using a single scan mirror attached to a commercially available galvanometer scanner. The galvanometer and scan mirror are coupled to a custom controlled rotary head assembly. The galvanometer deflects the scan mirror in a fast scan direction to create a scanline of the laser beam. A pneumatic/ hydraulic linear feed unit is used to rotate the rotary head assembly and thus the galvanometer/scan mirror assembly. By rotating the head assembly, the entire galvanometer assembly is moved, resulting in displacement of the beam along a slow scan axis across the film plane. A pneumatic/ hydraulic linear feed unit may be used. In such a unit, two pneumatic cylinders and one hydraulic metering cylinder are linked to move in unison. The hydraulic metering cylinder regulates the motion of the feed unit to ensure slow and constant rotation of the galvanometer assembly. The film is maintained stationary and in registration during the scanning process.

Compressed air, dry nitrogen, or another gas is applied to the pneumatic cylinders of the linear feed unit to cause the unit to move. The pressure of the compressed gas is regulated by a regulator valve before being applied to the pneumatic cylinders. In one embodiment, the regulator valves are electro-pneumatic proportional pressure regulator valves.

While the present invention may be practiced with 35 mm film scanners/recorders, the present invention may also be used for scanning and/or recording images on other media, for example, color laser printers and color photocopiers.

The present invention provides reductions of mass, inertia, control complexity and size over the prior art.

DETAILED DESCRIPTION OF THE INVENTION

A method and apparatus for providing precise positioning of beams to allow reading or writing information from or to an area is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

To read or write information from or to an area using beams such as light beams, precise positioning of the light beams over a specific portion of the area is needed. The present invention provides a method and apparatus using a pneumatic/hydraulic actuator for precise positioning of light beams to scan or print an image. The actuator provides controlled constant velocity linear motion along a scan axis of an image.

Figure 1:
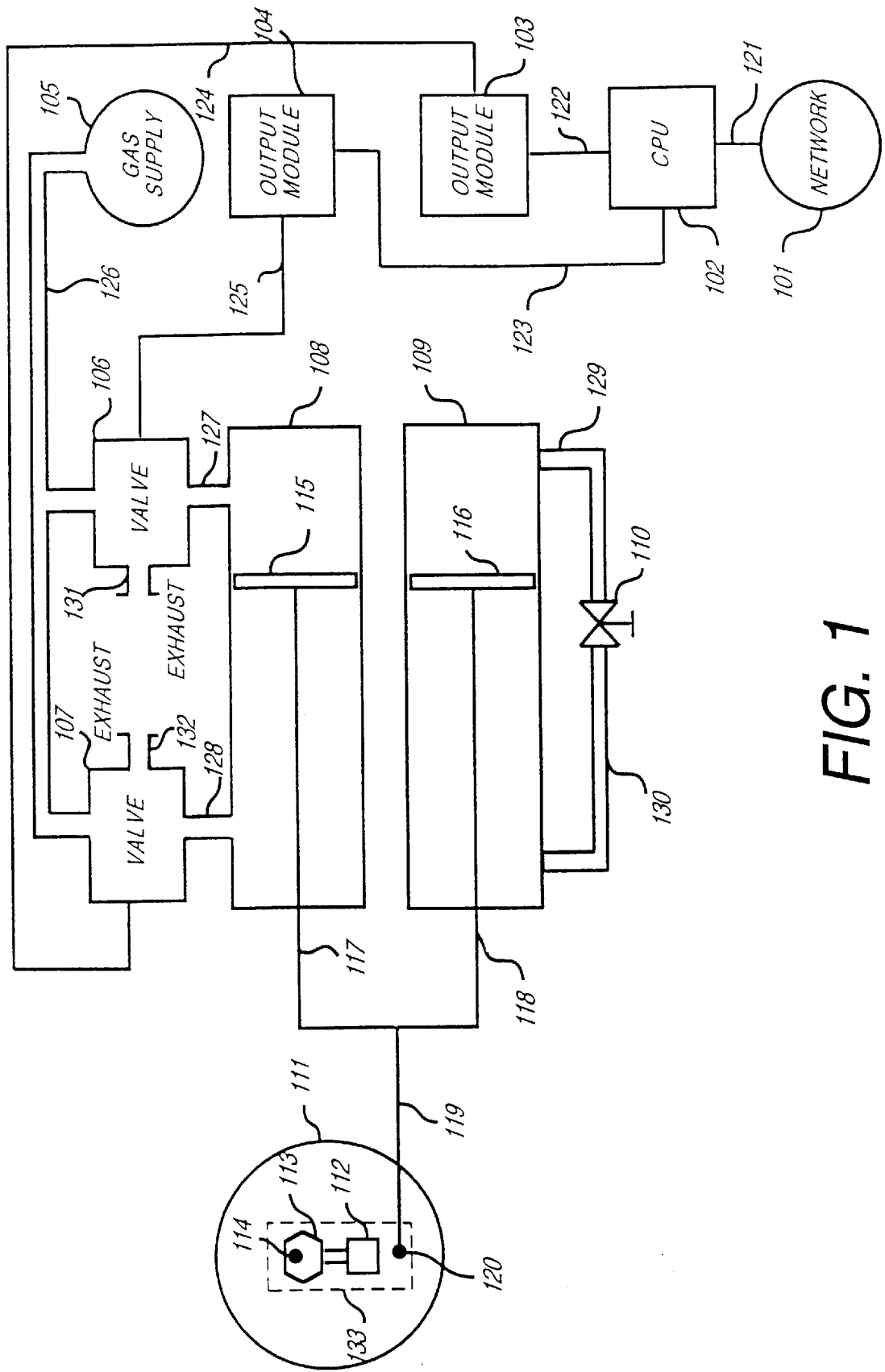
FIG. 1 is a schematic diagram illustrating the pneumatic/ hydraulic beam deflection apparatus of one embodiment of the present invention.

FIG. 1 is a schematic diagram illustrating one embodiment of the pneumatic/hydraulic beam deflection apparatus of the present invention. Central processing unit (CPU) 102 is coupled to network 101 via network connection 121. CPU 102 is also coupled to output module 103 via electrical coupling 122 and to output module 104 via electrical coupling 123. CPU 102 may be any suitable type of processor, for example a microprocessor or microcontroller, or computer, for example a personal computer or workstation. Output module 103 is coupled to electro-pneumatic pressure regulator valve 107 via electrical coupling 124. Output module 104 is coupled to electro-pneumatic pressure regulator valve 106 via electrical coupling 125.

Valves 106 and 107 are coupled to pressurized gas supply 105 via gas tube 126. Each of cylinders 108 and 109 has an extension end and a retraction end. Cylinder 108 is a pneumatic cylinder and cylinder 109 is a hydraulic cylinder. Valve 106 is coupled to the extension end of cylinder 108 via gas tube 127 and to exhaust gas outlet 131. Valve 107 is coupled to the retraction end of cylinder 108 via gas tube 128 and to exhaust gas outlet 132. Piston 115 moves linearly within cylinder 108, extending or retracting rod 117. Piston 116 moves linearly within cylinder 109, extending or retracting rod 118. Rods 117 and 118 are coupled to linkage 119, which is coupled to arm 133 at pivot point 120. Arm 133 is coupled to bearing 111 and in this embodiment extends radially from the center of bearing 111 at pivot 114. Galvanometer 112 is mounted on bearing 111 and is coupled to mirror 113. Cylinder 109 is coupled to hydraulic line 129 at its extension end and to hydraulic line 130 at its retraction end. Hydraulic line 129 is coupled to hydraulic line 130 through needle valve 110. Cylinder 109 operates as a hydraulic metering cylinder.

To scan or print a frame of film, the film is positioned in a film transport. Red, green and blue (RGB) lasers are prepared for operation. CPU 102 generates control signals which are applied to output modules 103 and 104 through couplings 122 and 123, respectively. Output modules 103 and 104 provide signals to valves 107 and 106 through couplings 124 and 125, respectively. Output modules 103 and 104 may be relays that produce digital signals or may be other devices that produce analog or digital output signals suitable for control of valves 106 and 107.

Valves 106 and 107 control the flow of pressurized gas from gas supply 105 to cylinder 108 through gas tubes 126, 127 and 128. When gas is admitted to cylinder 108, piston 115 is moved so as to extend or retract rod 117. Rod 117 transfers its motion to linkage 119, which in turn causes bearing 111 to rotate about pivot 114. Pivot 114 is the same as the nominal optical center of galvanometer mirror 113. When bearing 111 rotates, a galvanometer assembly that includes galvanometer 112 and mirror 113 is also rotated. Rotation of mirror 113 changes the deflection of a combined RGB laser beam reflected from mirror 113 to the film to be scanned or printed. The motion of piston 115 is regulated by the motion of piston 116 within cylinder 109, which is in turn regulated by the setting of needle valve 110.

Figure 2:
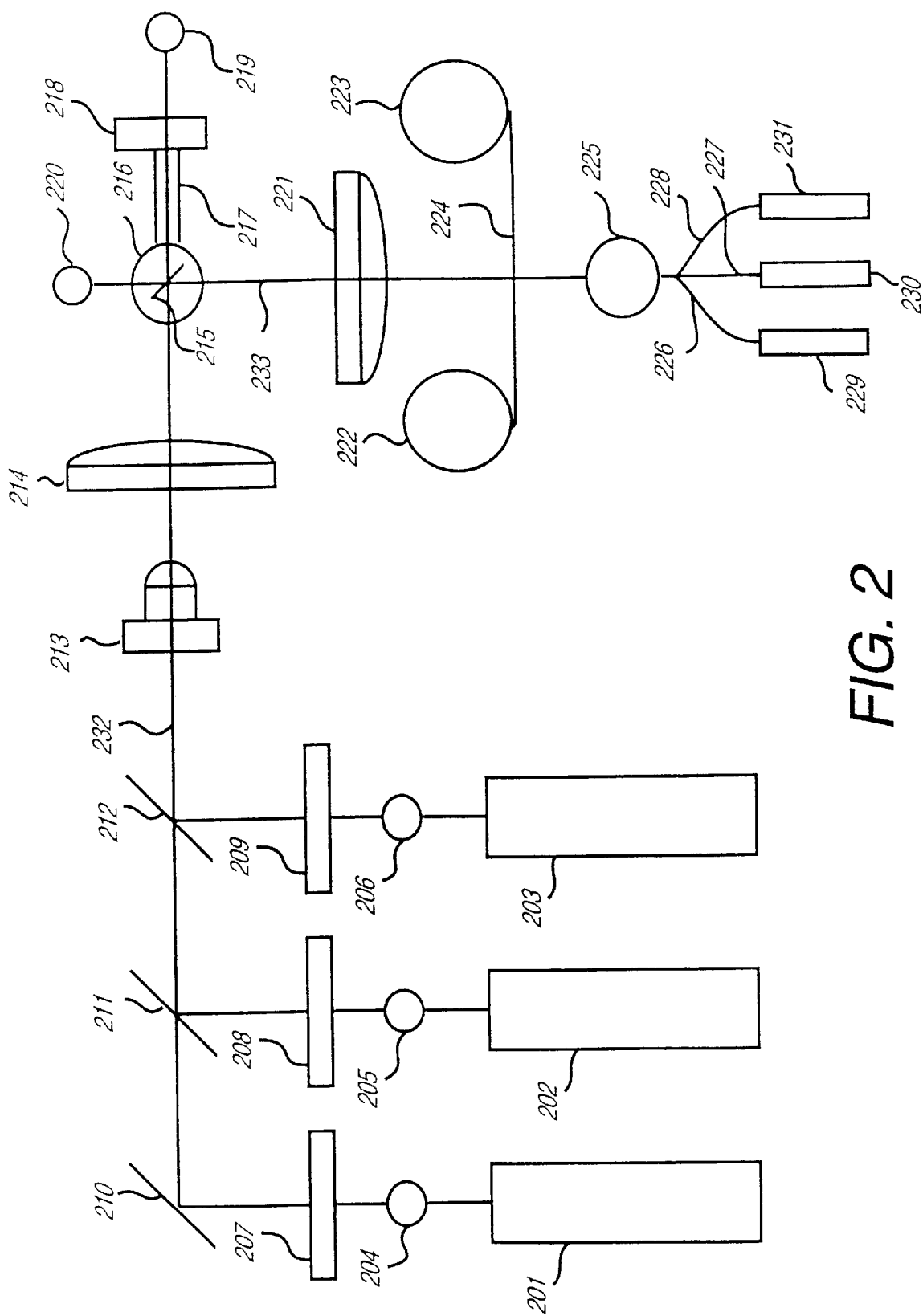
FIG. 2 is a schematic diagram illustrating one embodiment of a system in which the present invention may be used.

FIG. 2 is a schematic diagram illustrating a system in which the present invention may be used. Laser 201 produces a red beam that is directed through modulator 204 and neutral density filter wheel 207 to mirror 210. Laser 201 may be a helium neon laser, a semiconductor laser, or any other red laser known in the art.

Green laser 202 produces a beam that is directed through modulator 205 and neutral density filter wheel 208 to beam splitter 211. Green laser 202 may be a semiconductor laser, a gas laser, or any other green laser known in the art.

Blue laser 203 produces a beam directed through modulator 206 and neutral density filter wheel 209 to beam splitter 212. Blue laser 203 may be a semiconductor laser, an argon ion laser, or any other blue laser known in the art.

Modulators 204, 205, and 206 may be electro-optical modulators, acousto-optical modulators, or any other modulators known in the art. In one embodiment, three acousto-optical modulators are also used as part of a broadband electro-optical feedback loop to provide noise compensation for the three laser beams. The noise compensation eliminates intensity fluctuation and maintains amplitude stability.

Neutral density filter wheels 207, 208, and 209 provide variable attenuation of the laser beams. Alternatively, other devices may be used to provide variable attenuation of the laser beams. For example, polarizing material or liquid crystal devices may be used.

Mirror 210 directs the red laser beam from red laser 201 along optical axis 232. Beam splitter 211 combines the green laser beam from green laser 202 with the red laser beam along optical axis 232. Beam splitter 212 combines the blue laser beam from blue laser 203 with the red and green laser beams along optical axis 232. Mirror 210 and beam splitters 211 and 212 help make the system package compact and allow for precise collinear alignment of all three beams.

The combined beam produced from the red, green, and blue beams is directed colinearly through beam expander 213, which forms the combined beam into the proper size and shape for imaging. After passing through beam expander 213, the combined beam is directed through collimating lens 214. Collimating lens 214 directs the combined beam toward mirror 215. Mirror 215 reflects the combined beam along optical axis 233. The combined beam then passes through scanning lens 221.

A film transport comprising film supply reel 222, film plane 224, and film take-up reel 223 is positioned such that the combined beam along optical axis 233 is directed across film plane 224. If the system is used to write an image to film, unexposed film is provided on film supply reel 222. The frame of unexposed film to be exposed is positioned on film plane 224. The film is exposed by being illuminated by the combined beam. After the frame has been exposed, the film is advanced such that the exposed frame is stored on take up reel 223.

If the system is used to read an image from film, processed film containing the image is placed on film supply reel 222. The film is advanced until the desired image is positioned on film plane 224. The combined beam is scanned across the image on film plane 224. As the combined beam passes through the image on film plane 224, the red, green, and blue components of the combined beam are attenuated according to the pigmentation of the image on film plane 224.

The light passing through film plane 224 is collected by integrating sphere 225. The light from integrating sphere 225 is transmitted via fiber optic cable 226 to red photodetector 229, via fiber optic cable 227 to green photodetector 230, and via fiber optic cable 228 to blue photodetector 231. Red photodetector 229, green photodetector 230, and blue photodetector 231 may be photomultiplier tubes, charge coupled devices, or other photodetectors known in the art, and may be individually sensitive to red, green, and blue light, respectively, or may have broader sensitivity with color filtering provided at integrating sphere 225 or fiber optic cables 226, 227 and 228.

Mirror 215 is mounted on galvanometer 216. Precise rotation of mirror 215 may be controlled by applying an electrical input to galvanometer 216. Galvanometer 216 is coupled via bracket 217 to rotary head 218. Rotary head 218 rotates about optical axis 232 and allows rotation of mirror 215 along an axis orthogonal to the axis of rotation provided by galvanometer 216. Thus, galvanometer 216 and rotary head 218 provide rotation of mirror 215 about two orthogonal axes.

A laser beam recorder (LBR) system such as that shown in FIG. 2 has distinct advantages over CRT (cathode ray tube) or EBR (electron beam recorder) technologies. Most significantly, an LBR system is able to scan high-quality photographs with excellent color reproduction, and no color crosstalk between the film dye lasers being read or exposed. Also, the high brightness characteristics of an LBR system can be utilized to expose very slow speed high-resolution films such as EK 5244, which has an effective ASA of 1. A precision laser-based system utilizing the present invention can produce pictures that are free of artifacts. Artifacts are caused by spot and scanline placement irregularities, resulting in banding errors in the image. Such problems are found to be typical of other scanning systems.

CRT-based technologies exhibit inherent photomask structure along with color bias and overall brightness limitations associated with the phosphor characteristic that impair use with high resolution films. EBR systems exhibit static charge buildup problems on film planes larger that 16 mm. This static charge buildup contributes to difficulties in overlapping scanlines repeatedly at the 1/e points. EBR technology also requires that film be exposed in black and white separations, thereby adding to the overall number of printing steps and increasing the possibility of distortion.

The present invention may be applied to the system of FIG. 2 by coupling the hydraulically damped pneumatic actuator of one embodiment of the present invention to rotary head 218. The hydraulically damped pneumatic deflection system of one embodiment of the present invention then controls rotation of rotary head 218.

Information about the position and motion of mirror 215 as influenced by galvanometer 216 is obtained through a system comprising laser 219 and detector 220. Laser 219, which in one embodiment is an infrared laser, directs a beam onto the backside of mirror 215 (i.e., the side of mirror 215 opposite that onto which the combined beam along optical access 232 is directed). The beam from laser 219 is reflected by the backside of mirror 215 toward detector 220.

Detector 220 can measure the position of mirror 215 by measuring the point at which the reflected beam is received. In one embodiment, detector 220 is a split detector that allows identification of a particular point along the range of movement of mirror 215 provided by galvanometer 216. Galvanometer 216 is used to rotate mirror 215 so as to deflect the combined beam through raster scan lines across an image. Accordingly, the ability of detector 220 to identify a particular point along each scan line provides an indexing feature. This indexing feature allows alignment of scan lines relative to each other. Alternatively, detectors capable of identifying a plurality of points along a scan line may be used to detect the position of mirror 215. A linear or rotary encoder attached to rotary stage 218 may also be used.

A high-precision three color laser based film scanner/recorder system such as the system of FIG. 2 utilizing the present invention may be used for reading and writing a variety of film formats, including 35 mm, on a variety of film stocks. When the present invention is applied to such a system, the system provides full color high resolution imaging, free from scan artifacts, enabling traditionally photographed motion-picture film to be inter-cut with digital raster image photography. Such a system utilizing the present invention may be applied, for example, to the art of blue-screen traveling-matte cinematography for motion picture special effects and/or full-length digital motion pictures. One embodiment of a film scanner/recorder system utilizing the present invention uses conventional laser technology to provide illumination sources.

This embodiment scans an image, for example a 25.17 mm×37.719 mm Vistavision frame, on an academy frame with a three-color laser spot. The scanner/recorder system uses a helium-neon laser to generate the red spot, and GaAs semiconductor lasers for the green and blue Gaussian spots on the film plane. The system is configured so that it can be used as a film recorder or raster output scanner (ROS) and as a film reader or raster input scanner (RIS). The system is capable of processing high-resolution images that may be used to provide artifact-free electronic matting for motion picture film productions.

In the raster output scanner (ROS) mode of this system, the red, green, and blue laser beams are intensity modulated using three acousto-optical modulators (AOM), one for each of the red, green, and blue beams. High-resolution image data are transferred from line buffers through the appropriate D/A light modulators. A 3-channel RGB interface with line buffering provides the appropriate data rate through an I/O control for each RGB, D/A and A/D channel. The three beams are combined coaxially into a single combined beam using dichroic mirrors.

The combined beam is then sent through a beam expander, a changeable microscope objective. The purpose of the expander is to give the laser beam the proper shape and size for imaging into a spot in front of the scanning lens in this pre-focused system. The beam is then collimated and passed onto the galvanometer mirror, which provides deflection in two axes through a multiple-element scan lens onto a 35 mm Bell and Howell film shuttle mechanism.

In the raster input scanner (RIS) mode, a collection lens and integrating sphere are installed to the rear of the film plane, and RGB light passing through the film plane is transmitted through a fiber optic link to three photomultiplier tubes (PMT). The system may be used, for example, to provide source signals for transmission densities of previously exposed blue-screen shots mounted in a 35 mm Kodak Standard perforation shuttle mechanism.

One embodiment of a film scanner/recorder system utilizing the present invention uses a helium-neon (10 mW) laser at 632.8 nm to produce the red beam, a 10 mW GaAs semiconductor laser at 532 nm to produce the green beam, and a 15 mW argon ion laser at 457.9 nm to produce the blue beam, or any other suitable type of laser may be used to produce any of the red, green, or blue beams. Excellent color reproduction is obtained by carefully matching the above wavelengths to the spectral sensitivity curves of Eastman color negative film, intermediate film, and color print film. The 514.5 nm line is very close to the yellow-forming layer in the above sensitivity curves.

In a laser recording system, two types of nonlinearity may affect performance. The first type of nonlinearity results from the transfer characteristics of the modulation system, for example a sine square curve. The second type of nonlinearity results from the characteristic curve of the film. To compensate for these nonlinearities, a hardware gamma correction table may be built into the system to obtain desirable gamma characteristics on film as well as matrix conversions of the integral to analytic densities for the above wavelengths in ROS mode.

In one embodiment of a scanning/recording system utilizing the present invention, the surface to be scanned or recorded is held in a stationary position, and a galvanometer mirror scanner mounted on a rotary head is used to provide two-axis scanning of the surface. The galvanometer moves the mirror to deflect the beam along a fast scan axis to provide scanlines across the surface, while the galvanometer mirror scanner is mounted on a rotary head assembly that rotates the galvanometer mirror scanner to provide movement along a slow scan axis across the surface generally perpendicular to the first scan axis. Two dimensional deflection of the laser beam or beams is advantageous for motion-picture applications in that it allows a film surface to remain registered and stationary during the exposure.

The galvanometer moves the mirror in a constant-frequency saw-tooth scan, in one embodiment taking approximately 80% of the scan cycle time to generate a scanline and 20% of the cycle for repositioning back to the start of the scanline. The rotary head assembly is controlled by the system interface to provide spacing increments of 0.5 microns between scanlines in one embodiment. Adjustment of the head velocity allows for spacing changes between successive scanlines. Scanlines can be spaced from 0 to 100% overlap by controlling the rate of rotation of the rotary head. A driver is used to control the galvanometer in the fast scan direction. The driver input is generated in one embodiment by a 14-bit DAC which is operated as a single linear ramp generator.

To monitor the position of the scanning beam, a separate IR laser and split optical detector system is used. A collimated and apertured laser beam is beamed onto the back of the galvanometer mirror. The signal beam is directed at a split IR photodetector, which is mechanically coupled to the rotary head assembly. The split photodetector provides a fixed start-of-scan image for each scanline. A beam expander and adjustable apertures are used to properly focus the signal beam. The rotary head assembly feedback system uses a high-resolution linear encoder monitoring the head position.

In one embodiment, a multiple-element 250 mm lens, aberration optimized for 457.9, 532, and 632.8 nm, used in an f/15 system is used for the scanning lens. The lens is capable of handling scan angles of ±8 degrees to fill a 25.17 mm×37.719 mm format (Vistavision) frame and 22 mm×16 mm academy aperture. In this embodiment, the same lens design is used for the collimating lens.

The film transport used in one embodiment is a modified wide-body version of the standard Albert Howell design circa 1911. It is a cam-operated, pin-registered, film shuttle mechanism. The wide-body configuration enables additional light collecting lenses to be adapted to the camera housing when the system is used in its film reading (RIS) configuration.

Recorder resolution is determined by testing film resolving characteristics from the manufacturers' published modulation transfer function (MTF) data and industry test films in line pairs per millimeter. Such test films, run in multiple theatre test programs with special resolution targets, provide an initial indication of required resolution. Other parameters which affect recorder resolution are spot size, computer memory capacity and bandwidth, film format size and shape and image size and shape on the desired film format. Human eye performance is also an important factor in theatre and film evaluation tests. The desired resolution for production use is at least 4000 lines by at least 2500 spots with a 10 $\mu m$ or smaller spot. To provide the desired level of performance, one embodiment of a scanner or printer according to the present invention provides variable resolution (500–10,000 lines) and a variable spot size.

Thus, the present invention may be used in a laser-based scanner operating in the ROS mode to provide excellent reproduction of color and artifact-free images from raster data at high speed. Likewise, in the RIS mode, an image may be scanned at high speed to provide accurate raster data representative of the image. Such capabilities may be employed advantageously especially in the field of cinematography for digital film scanning and recording.

Figure 3:
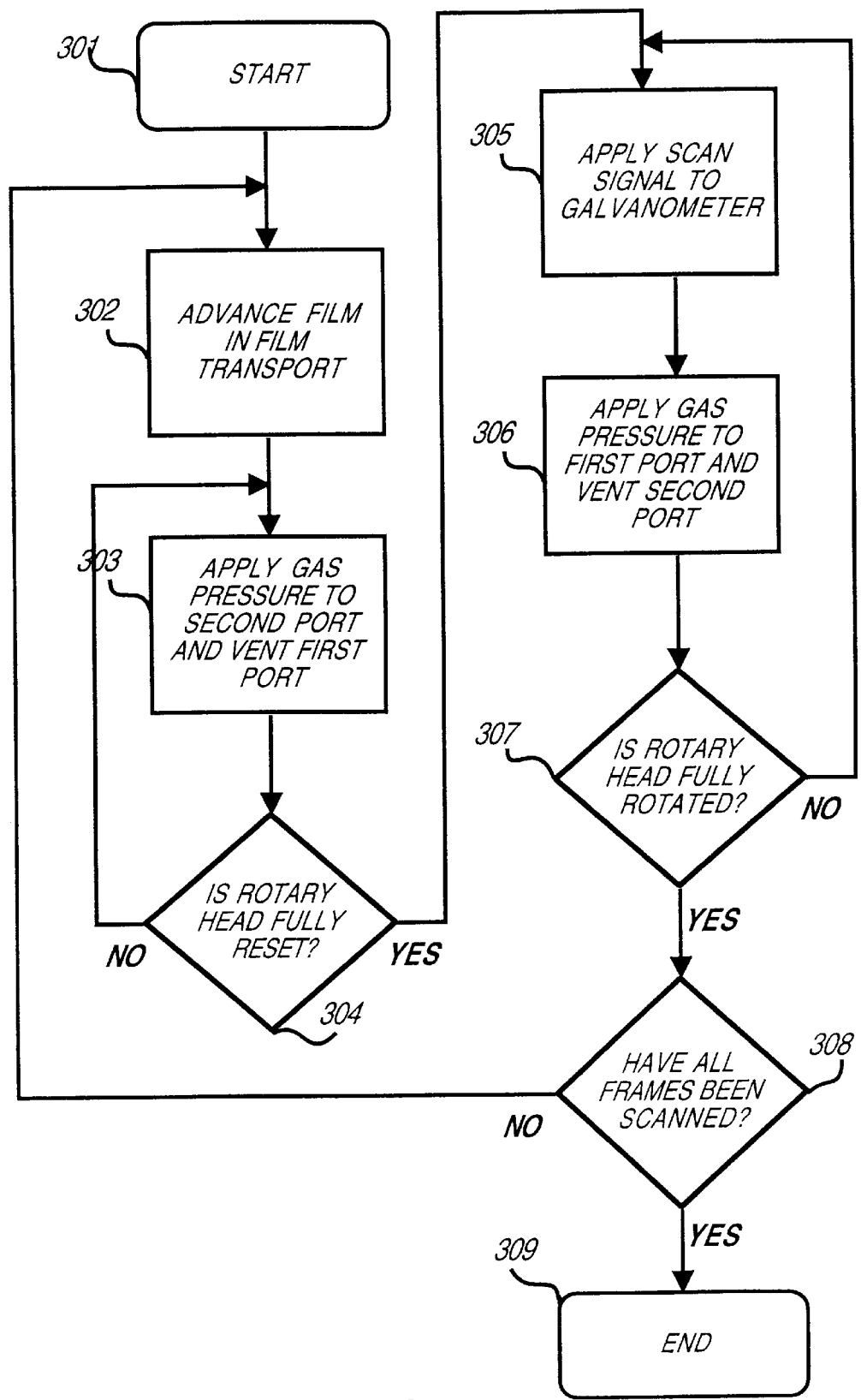
FIG. 3 is a flow diagram illustrating a method according to one embodiment of the present invention.

FIG. 3 is a flow diagram illustrating a method according to one embodiment of the present invention. The method is applied to a system such as the system of FIG. 2. The method begins in step 301 and continues to step 302. In step 302, the film in the film transport is advanced to the next frame to be scanned or recorded. From step 302, the method continues in step 303. In step 303, gas pressure is applied to a second port of the pneumatic cylinder and the first port of the pneumatic cylinder is allowed to vent to the atmosphere. From step 303, the method continues in step 304. In step 304, the method checks whether the rotary head has been returned to a fully reset position. If the head is not fully reset, the method continues in step 303, where gas pressure continues to be applied to the second port of the pneumatic cylinder and the first port of the pneumatic cylinder continues to be vented.

If, however, the rotary head has been fully reset, the method continues to step 305. In step 305, a scan signal is applied to the galvanometer mounted on the rotary head. In one embodiment, the scan signal is a sawtooth waveform. The linear diagonal portion of the sawtooth waveform advances the galvanometer, and hence the scan line, at a constant rate across the image. The vertical portion of the sawtooth waveform returns the galvanometer and the beam reflected by the galvanometer to the beginning of the scan line.

From step 305, the method continues in step 306. In step 306, gas pressure is applied to the first port of the pneumatic cylinder and the second port of the pneumatic cylinder is vented to the atmosphere. From step 306, the method continues in step 307. In step 307, the position of the rotary head is checked to determine if the rotary head has been fully rotated such that the entire surface to be scanned or recorded has been traversed. If the rotary head has not been fully rotated, the process continues at step 305, where the scan signal continues to be applied to the galvanometer followed by step 306, where gas pressure continues to be applied to the first port of the pneumatic cylinder and the second port of the pneumatic cylinder continues to be vented to the atmosphere.

If, however, the rotary head has been fully rotated, the method continues in step 308. In step 308, a determination is made as to whether all of the frames to be scanned or recorded have been scanned or recorded. If all of the frames have not yet been scanned or recorded, the method continues in step 302, where the film in the film transport is advanced to the next frame to be scanned or recorded. However, if all of the frames to be scanned or recorded have been scanned or recorded, the method ends in step 309.

Figure 4:
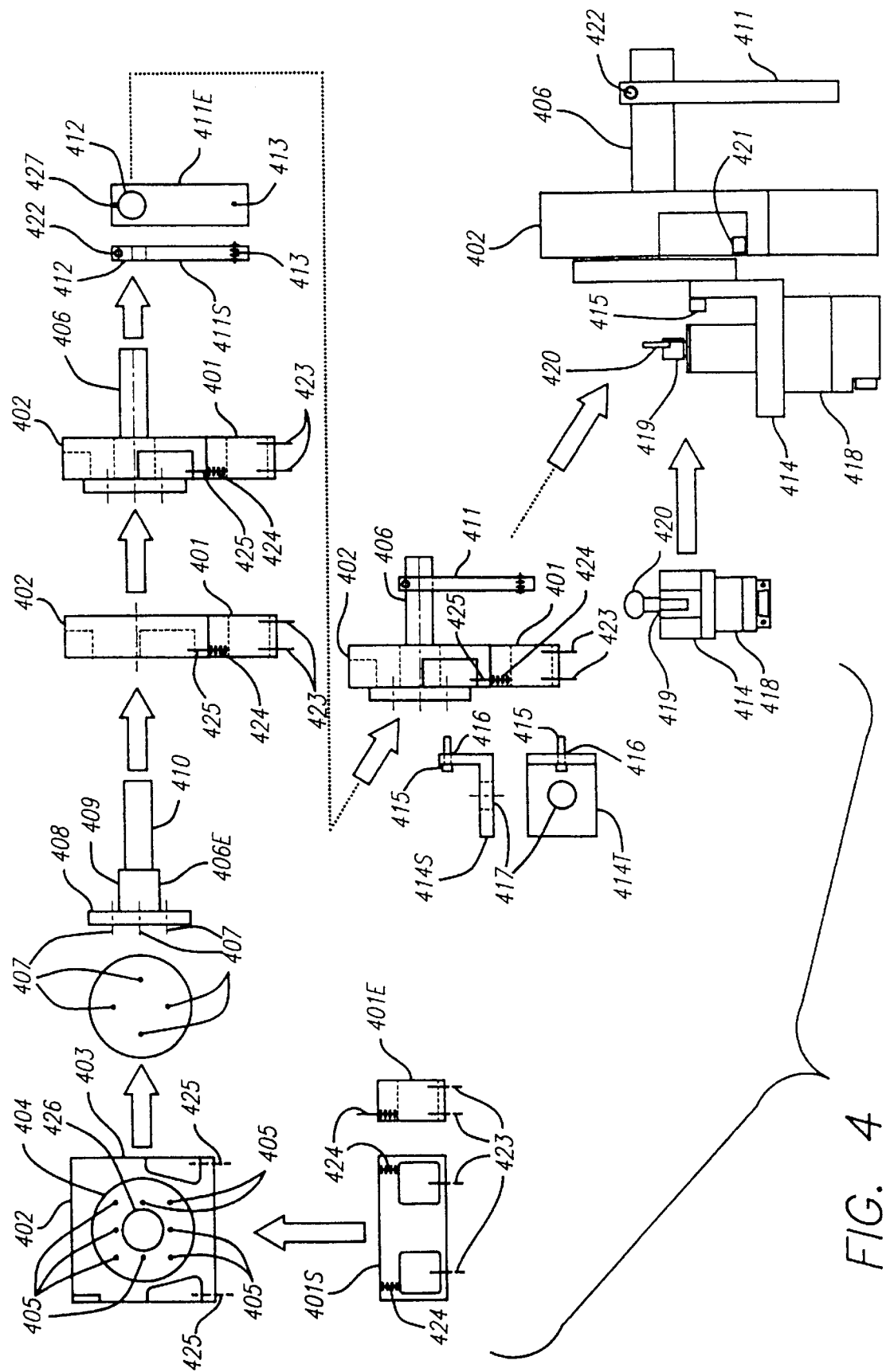
FIG. 4 is an exploded diagram illustrating one embodiment of a rotary head assembly according to the present invention.

FIG. 4 is an exploded diagram illustrating one embodiment of a rotary head assembly according to the present invention. Base 401 defines holes 423 for mounting base 401 in a stable position. Bolts may be passed through holes 423 to secure base 401 to a surface, for example an optical table. Base 401 also defines holes 424.

Bearing assembly 402 comprises outer member 403 and inner member 404. Outer member 403 defines holes 425. Bolts 421 may be passed through holes 425 and 424 to secure outer member 403 to base 401. Base 401 is illustrated by side view 401S and end view 401E.

In one embodiment of the invention, inner member 404 rotates smoothly within outer member 403, allowing bearing assembly 402 to function as a rotational bearing. Inner member 404 defines holes 405.

Rotating member 406 comprises plate 408, cylinder 409, and shaft 410, all of which are coaxial. Plate 408 is adjacent to cylinder 409, and cylinder 409 is adjacent to shaft 410. Rotating member 406 is illustrated by end view 406E and side view 406S. Plate 408 defines holes 407. Holes 407 are preferably aligned with holes 405, and bolts may be passed through holes 407 and 405 to secure plate 408 to inner member 404.

Inner member 404 defines central hole 426. Rotating member 406 is mounted on inner member 404 in such a manner that cylinder 409 is positioned within central hole 426.

Arm 411 is illustrated by side view 411S and by end view 411E. Arm 411 defines hole 412 and hole 413. Arm 411 further defines gap 427. Hole 412 has a diameter substantially equal to or slightly larger than the diameter of shaft 410. Bolt 422, in conjunction with gap 427, is used to adjust the diameter of hole 412 to allow arm 411 to be securely mounted on shaft 410. Hole 413 has an axis parallel to the axis of hole 412. Hole 413 is located a distance from hole 412 to allow force applied normal to the axis of hole 413 to be converted to rotational torque at hole 412 and shaft 410.

L bracket 414 is illustrated by side view 414S and by top view 414T. L bracket 414 defines hole 416 and hole 417. The axis of hole 416 is normal to the axis of hole 417. Bolt 415 is passed through hole 416 into hole 407 to mount L bracket 414 to plate 408.

Galvanometer scanner assembly 418 provides rotation of galvanometer scanner shaft 419. Mirror 420 is mounted on galvanometer scanner shaft 419 and rotates with galvanometer scanner shaft 419. Galvanometer scanner shaft 419 is coaxial with hole 417 and normal to the axis of hole 416 and the axis of rotating member 406. Mirror 420 is positioned such that the axis of rotating member 406 intersects the surface of mirror 420. Galvanometer scanner assembly 418 is mounted through hole 417 and secured to L bracket 414.

Application of force at hole 413 in a direction normal to the axis of hole 413 provides rotational torque at hole 412. Since arm 411 is clamped to shaft 410 using bolt 422 and gap 427, the rotational torque applied at hole 412 is transmitted to shaft 410. Since shaft 410 is coupled to cylinder 409, the rotational torque is passed to cylinder 409. Since cylinder 409 is coupled to plate 408, the rotational torque is passed to plate 408. Plate 408 is coupled to inner member 404. Inner member 404 is allowed to rotate freely within outer member 403. Thus, the applied torque results in rotation of inner member 404 relative to outer member 403.

Since L bracket 414 is coupled to plate 408, L bracket 414 rotates along with plate 408. Since galvanometer scanner assembly 418 is mounted through L bracket 414, galvanometer scanner assembly 418 is also rotated about the axis of rotating member 406. Since mirror 420 is coupled to galvanometer scanner shaft 419 and galvanometer scanner shaft 419 is coupled to galvanometer scanner assembly 418, galvanometer scanner shaft 419 and, consequently, mirror 420 are also rotated about the axis of rotating member 406.

Since galvanometer scanner assembly 418 provides rotation to galvanometer scanner shaft 419, and mirror 420 is mounted on galvanometer scanner shaft 419, galvanometer scanner assembly 418 provides rotation of mirror 420 about the axis of galvanometer scanner shaft 419, which is normal to the axis of rotating member 406. Thus, rotation of mirror 420 about two axes is provided. Therefore, light incident upon mirror 420 may be deflected over a two-dimensional area.

Thus, a method and apparatus for providing precise positioning of beams to allow reading information from or writing information to an area has been described.

I claim:

1. A method comprising the steps of:

projecting a beam onto a reflective surface;

actuating a hydraulically-damped pneumatic cylinder to cause movement of said reflective surface about a first axis.

2. A method comprising the steps of:

projecting a beam onto a reflective surface;

actuating a hydraulically-damped pneumatic cylinder to cause movement of said reflective surface about a first axis; and actuating a galvanometer to cause movement of said reflective surface about a second axis.

3. The method of claim 2 further comprising the step of:

resetting said hydraulically-damped pneumatic cylinder to a first position.

4. The method of claim 3 further comprising the step of:

providing an electrical signal to cause said step of actuating said hydraulically-damped pneumatic cylinder to occur.

5. Apparatus comprising:

a reflective surface for reflecting an incident beam;

a galvanometer coupled to said reflective surface for rotating said reflective surface about a first axis;

a rotary head coupled to said galvanometer for allowing rotation of said reflective surface about a second axis;

a first cylinder coupled to said rotary head for rotating said rotary head;

a second cylinder coupled to said first cylinder for damping motion of said first cylinder.

6. The apparatus of claim 5 further comprising:

a first valve coupled to said first cylinder for applying fluid pressure to a first port of said first cylinder.

7. The apparatus of claim 6 further comprising:

a second valve coupled to said first cylinder for applying fluid pressure to a second port of said first cylinder.

8. The apparatus of claim 7 further comprising:

a first output module coupled to said first valve for controlling said first valve, and a second output module coupled to said second valve for controlling said second valve.

9. The apparatus of claim 8 further comprising:

a processor coupled to said first and second output modules for controlling said first and second output modules.

10. The apparatus of claim 5 wherein said first cylinder is a pneumatic cylinder.

11. The apparatus of claim 10 wherein said second cylinder is a pneumatic cylinder.

12. The apparatus of claim 10 wherein said second cylinder is a hydraulic cylinder.

13. The apparatus of claim 5 wherein said second cylinder is a pneumatic cylinder.

14. The apparatus of claim 5 wherein said first cylinder is a hydraulic cylinder.

15. The apparatus of claim 14 wherein said second cylinder is a pneumatic cylinder.

16. The apparatus of claim 14 wherein said second cylinder is a hydraulic cylinder.

17. The apparatus of claim 5 wherein said second cylinder is a hydraulic cylinder.

* * * * *